(12) United States Patent
Conrad

(10) Patent No.: US 11,441,844 B2
(45) Date of Patent: Sep. 13, 2022

(54) METHOD OF RECYCLING HEAT

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 481 days.

(21) Appl. No.: 16/545,421

(22) Filed: Aug. 20, 2019

(65) Prior Publication Data

US 2021/0055053 A1  Feb. 25, 2021

(51) Int. Cl.
  *B29C 35/02* (2006.01)
  *F27D 17/00* (2006.01)
  *F27D 13/00* (2006.01)

(52) U.S. Cl.
  CPC ........... *F27D 13/002* (2013.01); *B29C 35/02* (2013.01); *F27D 17/003* (2013.01); *F27D 17/004* (2013.01); *F27D 2017/007* (2013.01)

(58) Field of Classification Search
  None
  See application file for complete search history.

(56) References Cited

U.S. PATENT DOCUMENTS

| | | | | |
|---|---|---|---|---|
| 3,078,529 A * | 2/1963 | Cooper | ................ | F27B 14/08 164/348 |
| 3,521,868 A * | 7/1970 | Englemanjoseph | .... | C21C 5/565 432/5 |
| 4,028,048 A * | 6/1977 | Woolworth | ........... | F27D 13/002 432/5 |

(Continued)

FOREIGN PATENT DOCUMENTS

| | | |
|---|---|---|
| CN | 203309864 U | 11/2013 |
| CN | 205651642 U | 10/2016 |
| CN | 207662213 U | 7/2018 |

(Continued)

OTHER PUBLICATIONS https://www.dwswa.org/recycle-reuse-articles/2016/5/12/how-aluminum-beverage-cans-are-recycled (Year: 2016).*

(Continued)

*Primary Examiner* — Michael G Hoang
*Assistant Examiner* — Kurt J Wolford
(74) *Attorney, Agent, or Firm* — Philip C. Mendes da Costa; Bereskin & Parr LLP/S.E.N.C.R.L., s.r.l.

(57) ABSTRACT

This disclosure provides a method of recycling heat during operation of a plant in which equipment for processing at least two different materials is co-located. The method comprises a first process for processing a first material and a second process for processing a second material. The second material has a melting point that is less than a melting point of the first material. During the first process, the first material is subjected to a first melting process and then subjected to a first cooling process that includes solidification of the first material. During the second process, the second material is subjected to a second melting process and then subjected to a second cooling process that includes solidification of the second material. The method comprises recovering heat from the first cooling process and using at least some of the heat as a heat source for the second melting process.

21 Claims, 3 Drawing Sheets

(56) References Cited

U.S. PATENT DOCUMENTS

| | | | | |
|---|---|---|---|---|
| 4,655,436 A | * | 4/1987 | Williams | C21C 5/565 |
| | | | | 266/44 |
| 5,264,020 A | | 11/1993 | Ehle et al. | |

FOREIGN PATENT DOCUMENTS

| | | | | |
|---|---|---|---|---|
| CN | 108955283 A | * | 12/2018 | |
| JP | H11152368 A | | 6/1999 | |
| JP | 4022854 B2 | | 12/2007 | |
| KR | 101608154 B1 | | 3/2016 | |
| WO | WO-2015038027 A1 | * | 3/2015 | F27B 3/065 |
| WO | WO-2016062922 A1 | * | 4/2016 | B22D 41/08 |
| WO | WO-2018083433 A1 | * | 5/2018 | F27B 3/04 |

OTHER PUBLICATIONS https://www.cadybag.com/polypropylene-recycling-process-introduction/ (Year: 2017).* https://www.scrantonproducts.com/how-do-they-recycle-hdpe/ (Year: 2018).* https://thelibraryofmanufacturing.com/ingot_manufacture.html (Year: 2012).* https://www.sciencedirect.com/topics/engineering/district-heating-system (Year: 2017).*

English translation of CN 108955283 A (Year: 2018).*

English translation of WO 2018083433 A1 (Year: 2018).*

English translation of WO 2016062922 A1 (Year: 2016).*

English translation of WO 2015038027 A1 (Year: 2015).*

J Selvajar et al.: "Waste Heat Recovery From Metal Casting and Scrap Preheating Using Recovered Heat", Procedia Engineering 97 (2014) 267-276, available online at www.sciencedirect.com; published at least as early as Dec. 2014.

Mobin M. Mathew et al.: "Performance Comparison for Aluminium, Copper and Steel Shots in Waste Heat Recovery and Scrap Preheating from Solidifying Molten Metal", ARPN Journal of Engineering and Applied Sciences, available inline at www.arpnjournals.com, vol. 11, No. 9, published at least as early as May 2016.

Wang et al.: "Analysis of Waste heat Recovery to Steel Scrap Preheating in an Enclosure Vessel", Materials Science Forum vols. 449-452 (2004), pp. 329-332, Trans Tech Publications, Switzerland, dated Mar. 15, 2004.

Espacenet: English machine translation of CN207662213; published on Jul. 27, 2018.

Espacenet: English machine translation of CN205651642, published on Oct. 19, 2016.

Espacenet: English machine translation of CN203309864, published on Nov. 27, 2013.

Espacenet: English machine translation of KR101608154, published on Mar. 31, 2016.

Espacenet: English machine translation of JP11152368, published on Jun. 8, 1999.

Espacenet: English machine translation of JP4022854B2, published on Dec. 19, 2007.

\* cited by examiner

METHOD OF RECYCLING HEAT

FIELD

This application relates generally to energy recycling. In one aspect, the method relates to using different grades of heat recovered during the cooling of one material for processing other materials and/or heating. In another aspect, the method relates to recycling heat during operation of a plant in which equipment for processing at least two different materials is co-located.

INTRODUCTION

Methods of energy recycling are known. Material processing plants are also known. Recycling plants commonly convert waste materials into reusable raw materials and/or finished goods by melting and subsequently recasting the material.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

During the processing of a material, the material is typically heated to enable the material to be combined with other materials and/or purified and the treated material may then be cooled and formed into a desired shape. The cooling produces waste heat, which may then be used elsewhere in a plant. Typically, waste heat may be captured and then used, e.g., for pre-heating a material that is to be processed or to produce steam that may be used for heating. In such cases, the heat may be captured and transferred within a plant by using a heat exchange fluid that passes through cooling tubes in thermal communication with a reactor in which the material is cooled. As a result, the heat exchange fluid is heated to a particular temperature.

In accordance with one aspect of this disclosure, different grades of heat may be obtained from a material as the material is cooled. For example, as a material is cooled, e.g., from its melting point to room temperature, the material will transition through a large temperature range. As the material transitions through this temperature range, different grades of heat may be obtained. Accordingly, for example, steel may have a melting temperature of 1,370° C. As steel cools, heat may be recovered as steel cools from 1,370° C. to, e.g., 1,200° C. This heat may be used, e.g., to heat and, optionally melt, copper, which may have a melting temperature of 1,085° C. As the steel continues to cool, a different heat stream may be recovered as the steel cools from 1,200° C. to, e.g., 800° C. This different heat stream may be used, e.g., to heat and, optionally melt, aluminum, which may have a melting temperature of 660° C. Accordingly, heat of differing grades (temperatures) may be obtained as the steel cools. The grades of heat which are recovered may be selected based on the intended use of the recovered heat.

It will be appreciated that, in some embodiments, heat may only be applied to initially melt the steel. Subsequent processes may be able to operate without the input of any additional heat (e.g., additional heat may not be required to melt the copper or aluminum). Alternately, the amount of heat which has to be inputted (e.g., to melt the copper or aluminum) may be reduced.

In accordance with another aspect of this disclosure, a plant may have co-located therein equipment to process two or more different materials. An example is a plant to recycle metal(s) and/or plastic(s). In such cases, heat may be inputted to the system to initially melt the material with the highest melting point. Heat recovered at different stages during the cooling cycle of the material with the highest melting point may be captured and used to melt, or assist in melting, other material(s) that is (are) to be recycled. Accordingly, heat at a first temperature may be recovered during the cooling cycle of the material with the highest melting point (e.g., a heat transfer fluid may be heated during the first portion of a cooling cycle of the material with the highest melting point to the first temperature). Further, heat at a second temperature may be recovered during the cooling cycle of the material with the highest melting point (e.g., another heat transfer fluid may be heated during a subsequent portion of a cooling cycle of the material with the highest melting point to the second temperature).

It will be appreciated that different grades of heat may be recovered from subsequent materials that are processed (melted) using heat recovered from the material with the highest melting point.

In accordance with this disclosure, there is provided a method of recycling heat during operation of a plant in which equipment for processing at least two different materials is co-located, the method comprising:
  (a) a first process which processes a first material having a first melting point, wherein, during the first process, the first material is subjected to a first melting process and then subjected to a first cooling process that includes solidification of the first material;
  (b) a second process which processes a second material having a second melting point, wherein the second melting point is less than the first melting point and, during the second process, the second material is subjected to a second melting process and then subjected to a second cooling process that includes solidification of the second material; and,
  (c) recovering heat from the first cooling process and using at least some of the heat as a heat source for the second melting process.

In some embodiments, the heat recovered from the first cooling process may comprise heat recovered during the solidification of the first material.

In some embodiments, the method may further comprise recovering heat from the second cooling process and using at least some of the heat recovered from the second cooling process as a heat source for a building, wherein the heat recovered from the second cooling process comprises heat recovered during the solidification of the second material.

In some embodiments, the method may further comprise recovering heat from the second cooling process and using at least some of the heat recovered from the second cooling process as a heat source in the production of steam, wherein the heat recovered from the second cooling process comprises heat recovered during the solidification of the second material.

In some embodiments, wherein during the first cooling process, the first material may be cooled to a first temperature and a second temperature that is less than the first temperature, wherein recovering heat from the first cooling process may comprise recovering heat as the first material is cooled to the first temperature, and the method may further comprise:
  (a) a third process which processes a third material having a third melting point, wherein the third melting point is less than the second melting point and, during the third process, the third material is subjected to a third melting process and then subjected to a third cooling process that includes solidification of the third material; and, (b) recovering additional heat from the first cooling process as the first material is cooled to the second temperature and using at least some of the additional heat that is recovered as a heat source for the third melting process.

In some embodiments, the additional heat recovered from the first cooling process may be recovered as the first material is cooled from the first temperature to the second temperature.

In some embodiments, the method may further comprise recovering heat from the second cooling process and using at least some of the heat recovered from the second cooling process as a heat source for the third melting process.

In some embodiments, the method may further comprise selecting a metal as the first material and selecting a plastic as the second material.

In some embodiments, recovering heat from the first cooling process may comprise using a first heat exchange fluid to recover heat from the first cooling process.

In some embodiments, wherein the first heat exchange fluid conveys the heat recovered from the first cooling process to a reactor containing a second heat exchange fluid, using at least some of the heat as a heat source for the second melting process may comprise using the second heat exchange fluid to convey the heat to the second melting process.

In some embodiments, the first heat exchange fluid may comprise a liquid metal.

In some embodiments, wherein during the first cooling process, the first material is cooled to a third temperature that is less than the second temperature, the method may further comprise recovering further additional heat from the first cooling process as the first material is cooled to the third temperature and using at least some of the further additional heat as a heat source for a building.

In some embodiments, wherein during the first cooling process, the first material is cooled to a third temperature that is less than the second temperature, the method may further comprise recovering further additional heat from the first cooling process as the first material is cooled to the third temperature and using at least some of the further additional heat in the production of steam.

In some embodiments, the first process may use at least some recycled first material.

In some embodiments, the second process may use at least some recycled second material.

In some embodiments, the third process may use at least some recycled third material.

In some embodiments, the method may further comprise selecting a metal as the first material, selecting a first plastic as the second material and selecting a second plastic as the third material, wherein the second plastic has a lower melting point than the first plastic, and wherein the first plastic has a lower melting point than the metal.

In some embodiments, wherein during the first cooling process, the first material is cooled to a third temperature that is less than the second temperature, the method may further comprise:

(a) a fourth process which processes a fourth material having a fourth melting point, wherein, the fourth melting point is less than the third melting point and, during the fourth process, the fourth material is subjected to a fourth melting process and then subjected to a fourth cooling process that includes solidification of the fourth material; and, (b) recovering further additional heat from the first cooling process as the first material is cooled to the third temperature and using at least some of the further heat that is recovered as a heat source for the fourth melting process.

In some embodiments, wherein during the second cooling process, the second material is cooled to a fourth temperature and a fifth temperature that is less than the fourth temperature, the method may further comprise recovering heat from the second cooling process as the second material is cooled to the fourth temperature and using at least some of the heat recovered from the second cooling process as a heat source for the third melting process and recovering additional heat from the second cooling process as the second material is cooled to the fifth temperature and using at least some of the additional heat that is recovered from the second cooling process as a heat source for the fourth melting process.

In some embodiments, the method may further comprise recovering heat from the third cooling process and using at least some of the heat recovered from the third cooling process as a heat source for the fourth melting process.

In some embodiments, the method may further comprise selecting a first metal as the first material, selecting a second metal as the second material, selecting a first plastic as the third material and selecting a second plastic as the fourth material, wherein the second plastic has a lower melting point than the first plastic, wherein the first plastic has a lower melting point than the second metal, and wherein the second metal has a lower melting point than the first metal.

In some embodiments, the fourth process may use at least some recycled fourth material.

It will be appreciated by a person skilled in the art that a method or apparatus disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
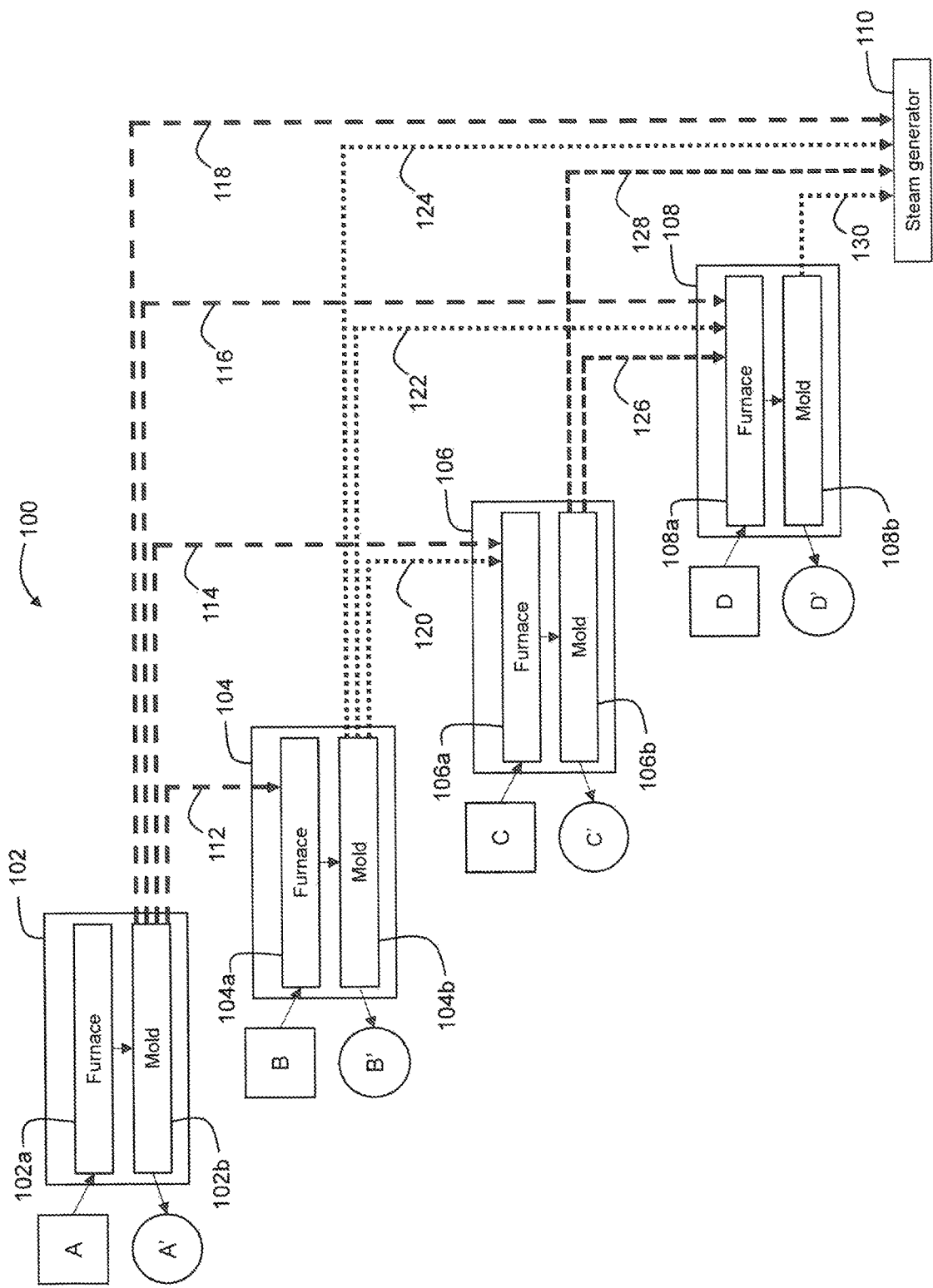
FIG. 1 is a schematic block diagram illustrating a plant in which equipment for processing at least two different materials is co-located.

The drawings included herewith are for illustrating various examples of articles, methods, and apparatuses of the teaching of the present specification and are not intended to limit the scope of what is taught in any way.

DETAILED DESCRIPTION

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The terms "an embodiment," "embodiment," "embodiments," "the embodiment", "the embodiments", "one or more embodiments", "some embodiments", and "one embodiment" mean "one or more (but not all) embodiments of the present invention(s)", unless expressly specified otherwise.

The terms "including", "comprising", and variations thereof mean "including but not limited to", unless expressly specified otherwise. A listing of items does not imply that any or all of the items are mutually exclusive, unless expressly specified otherwise. The terms "a", "an", and "the" mean "one or more", unless expressly specified otherwise.

Material processing plants may be used to process a variety of materials, such as glass, steel, copper, aluminum, plastic, etc., (some or all of which may be recycled) into a useful object, such as raw materials or finished goods. Through a melting process and subsequent cooling process, a particular material can be combined with other materials and/or reformed as desired. For example, aluminum that is to be recycled (e.g. from cans, foils, kitchen utensils, window frames, beer kegs, etc.) can be converted into blocks of aluminum for use as raw material in a manufacturing process. Alternatively, the recycled aluminum can be reformed into a finished good, e.g. a new beer keg. Material processing plants typically use furnaces, kilns, or other suitable melting equipment to melt the material and molds, dies, or other suitable casting or extrusion equipment to solidify the melted material into a desired configuration.

Over the course of its daily operations, a material processing plant may process more than one type of material. For example, a material processing plant may process two or more of steel, copper, aluminum, and high-density polyethylene (HDPE). Alternatively, another processing plant may process two or more of glass, ceramic, and zinc. These material processing plants may have processing equipment for each type of material. For example, a plant processing aluminum and zinc may have (i) a furnace for melting aluminum, (ii) a mold for solidifying the aluminum as it cools, (iii) a furnace for melting zinc, and (iv) a mold for solidifying the zinc as it cools.

The furnace, kiln, or the like is heated to a temperature greater than or equal to the melting temperature of the material being melted therein. For example, the melting temperatures of steel, copper and aluminum may be approximately 1370° C., 1085° C. and 660° C., respectively, depending upon the alloy. It will be appreciated that heating and maintaining equipment at such high temperatures requires significant energy input.

The exemplary embodiments of this disclosure generally provide a method of recycling heat during operation of a plant in which equipment for processing at least two different materials is co-located. In this context, co-located refers to being located in the same general vicinity such that heat may be transferred between process equipment for the different materials (e.g. within the same plant or plants that are adjacent).

One method described herein generally has at least a first process (e.g., processing equipment) for processing a first material and a second process (e.g., processing equipment) for processing a second material. In accordance with this method, the melting temperature of the second material is less than the melting temperature of the first material. During the first process, the first material is subjected to a first melting process and then subjected to a first cooling process that may include the solidification of the first material. Similarly, during the second process, the second material is subjected to a second melting process and then subjected to a second cooling process that may include the solidification of the second material. The method includes recovering heat from the first cooling process and using at least some of the heat as a heat source for the second melting process. The heat recovered from the first cooling process includes heat recovered during the cooling (e.g., solidification) of the first material.

Since the melting temperature of the second material is less than the melting temperature of the first material, heat may be recovered from the first cooling process that may be above the melting temperature of the second material. Accordingly, heat recovered from the first cooling process may be used to melt the second material without the need of any additional heat input. In such cases, a plant that recycles two materials may be operated by inputting heat only to melt the first material.

It will be appreciated that, depending upon the volume of the first and second materials that are to be recycled, sufficient heat may not be recovered from the cooling of the first material to melt all of the second material that is to be processed. For example, there may be more of the second material to be recycled than the first material.

Alternately, or in addition, the temperature of the heat recovered from the first cooling process may be less than the melting point of the second material. In any such case, additional heat may be inputted into the system (e.g., to the furnace used to melt the second material) so that the second material may be melted.

Accordingly, in some cases, the heat recovered from the first cooling process may augment a supplementary heat source used to heat the second material during the second melting process. This may reduce the energy consumption of the second melting process, and hence the cost to operate the second melting process) since the supplementary heat source would not have to provide as much heat.

After heat which is to be used for melting the second material (i.e. during the second melting process) has been withdrawn from the cooling process of the first material, the first material may be sufficiently hot such that further cooling of the first material may enable the capture of additional heat. This additional heat may be used to melt (or assist in melting) a third material and/or to heat a building. This may further reduce energy consumption and/or costs.

For example, in some embodiments, the method may have a third process for processing a third material having a melting temperature less than the melting temperature of the first material and, optionally, less than the melting temperature of the second material. As with the first and second processes, during the third process, the third material is subjected to a third melting process and then subjected to a third cooling process that may include the solidification of the third material. Additional heat may be recovered from the first cooling process and used as a heat source for the third melting process. For example, once the first material falls below the melting temperature of the second material, additional heat recovered from continued cooling of the first material in the first cooling process may be used as a heat source for the third melting processes.

In some embodiments, the method may also include recovering heat from the second cooling process and using at least some of the heat recovered from the second cooling process as a heat source for a third melting process and/or a heat source for a building. Accordingly, heat used in the melting process for a third material may be obtained from the first cooling process and the second cooling process. In such cases, additional heat may not have to be inputted into the system (e.g., to the furnace used to melt the third material).

Those skilled in the art will appreciate that the exemplary methods disclosed above may be modified to include even more processes. For example, the method may include six processes for processing six different materials. Optionally, these six materials may be selected to have successively declining melting temperatures (i.e. the melting temperature of the second material may be lower than the melting temperature of the first material; the melting temperature of the third material may be lower than the melting temperature of the second material; the melting temperature of the fourth material may be lower than the melting temperature of the third material; and so on). Alternatively, in another example, the method may include four, five, seven, eight or more processes for processing different materials.

Reference is now made to FIG. 1. FIG. 1 shows a schematic block diagram of a plant, referred to generally as 100, in which equipment for processing at least two different materials is co-located.

As exemplified, the plant 100 has four material processing zones 102, 104, 106 and 108 located therein. Each processing zone includes equipment to melt and reform a particular material or combination of materials. As exemplified, each processing zone 102, 104, 106 and 108 includes a furnace 102a, 104a, 106a and 108a to respectively melt an input material A, an input material B, an input material C and an input material D. It will be appreciated that one or more of the furnaces 102a, 104a, 106a, 108a may be a kiln, oven or other suitable melting equipment.

As exemplified, each material processing zone 102, 104, 106 and 108 is located within plant 100. In an alternative embodiment, one or more of the processing zones may be located within one or more adjacent plants. For example, each material may be treated in a separate plant that is located adjacent the other plant(s).

As exemplified, each processing zone 102, 104, 106 and 108 also includes a mold 102b, 104b, 106b and 108b to respectively solidify previously melted input materials A, B, C and D into a desired form as they cool. Respective outputs of molds 102b, 104b, 106b and 108b are an output material A', an output material B', an output material C' and an output material D'. In some cases, other material(s) may be combined with the previously melted material before, during or after it enters the corresponding mold. For example, glass microspheres may be added to previously melted material A as it enters mold 102b to decrease the density of output material A'. It will be appreciated that one or more of the molds 102b, 104b, 106b, 108b may be a die or other suitable casting equipment.

In order to melt input material A, e.g. in furnace 102a, as part of the first melting process, input material A is subjected to a temperature greater than or equal to the melting temperature of material A. Input material A may be a recycled material, a virgin material, or a combination thereof. For example, input material A may be glass (e.g. recycled jars, bottles, mirrors, display screens, or a combination thereof). If material A is glass, then the first melting process subjects input material A to a temperature greater than or equal to the melting temperature of glass (approximately 1,400-1,600° C. depending on composition). In order to recycle melted input material A, melted material A is then subjected to a first cooling process, e.g. in mold 102b, that may solidify melted material A into output material A'. For example, recycled glass jars (i.e. input material A) may be processed to form, e.g., a window (i.e. output material A').

Similarly, in order to melt input material B, e.g. in furnace 104a, as part of the second melting process, input material B is subjected to a temperature greater than or equal to the melting temperature of material B. Input material B may be a recycled material, a virgin material, or a combination thereof. For example, input material B may be copper (e.g. recycled wires, pipes, coins, or a combination thereof). In this example, the second melting process subjects input material B to a temperature greater than or equal to the melting temperature of copper (approximately 1,085° C. depending on composition). In order to recycle melted input material B, melted input material B is then subjected to a second cooling process, e.g. in mold 104b, that may solidify melted material B into output material B'. For example, recycled wire (i.e. input material B) may be processed to form, e.g., a pipe (i.e. output material B').

Those skilled in the art will appreciate that input material C may be similarly processed into output material C' through a third melting process and a third cooling process and that input material D may be similarly processed into output material D' through a fourth melting process and a fourth cooling process.

As a material begins to cool, it may release heat e.g., at or near its melting temperature. The released heat gradually decreases over time, e.g., to room temperature. Accordingly, different grades of heat (heat at different temperatures or temperature ranges) may be recovered as the material cools through this temperature range.

As exemplified in FIG. 1, heat released by material A as it cools during the first cooling process (e.g. in mold 102b) may be recovered by a heat exchange system 112. For example, the heat recovered by heat exchange system 112 may comprise heat recovered during the solidification of material A as it cools to a temperature $T_1$.

As will be described in more detail below, heat exchange system 112 may convey the heat recovered to furnace 104a where it may be used as a heat source in the second melting process (i.e. to melt or assist in melting input material B). Optionally, the melting temperature of input material B may be less than the melting temperature of input material A. In some cases, depending upon the volume of input materials A and B to be melted (e.g. in corresponding furnaces 102a and 104a), heat recovered from the first cooling process may provide sufficient heat for the second melting process. In such cases, no additional heat needs to be inputted to melt material B (e.g. in furnace 104a).

Alternatively, in other cases, the heat recovered during the first cooling process may be insufficient on its own to melt input material B (e.g. in furnace 104a). For example, the heat recovered may have a temperature less than the melting point of input material B. Alternately or in addition, the amount of material B to be processed may have a heat requirement in excess of the heat that is recovered from material A by heat exchange system 112. In such cases, additional heat may be inputted so that material B may be melted. However, in such cases, using the heat recovered during the first cooling process as a heat source in the second melting process may reduce the amount of additional heat that is inputted to melt input material B (i.e. during the second melting process).

After the heat that is recovered and conveyed to furnace 104a by heat exchange system 112 has been withdrawn from the first cooling process, material A may still be hot enough to recover further heat. As exemplified, additional heat may be recovered by a heat exchange system 114. Heat exchange system 114 may convey the further heat recovered to furnace 106a where it may be used as a heat source in the third melting process (i.e. to melt or assist in melting input material C).

The further heat recovered by heat exchange system 114 may comprise heat recovered during the solidification of material A as it cools from temperature $T_1$ to a temperature $T_2$ that is lower than temperature $T_1$. Alternately, the further heat recovered by heat exchange system 114 may comprise heat recovered during the solidification of material A as it cools from a temperature above temperature $T_1$ to a temperature $T_2$ that is lower than temperature $T_1$. Optionally, recovery of the further heat commences once material A has reached temperature $T_1$ so that the heat provided to the second process 104 is higher.

Optionally, the melting temperature of material C may be less than the melting temperature of input material A and optionally less than the melting temperature of input material B. In some cases, depending upon the volume of input materials A, B and C to be melted (e.g. in corresponding furnaces 102a, 104a, and 106a) and the amount and/or grade of heat conveyed to the second cooling process, the additional heat recovered from the first cooling process may provide sufficient heat for the third melting process. In such cases, no additional heat needs to be inputted to melt material C (e.g. in furnace 106a).

Alternatively, in other cases, the further heat recovered during the first cooling process may be insufficient on its own to melt input material C (e.g. in furnace 106a). For example, the additional heat recovered from the first cooling process may have a temperature less than the melting point of input material C. Alternately or in addition, the amount of material C to be processed may have a heat requirement in excess of the additional heat that is recovered from material A by heat exchange system 114. In such cases, additional heat may be inputted so that material C may be melted. However, in such cases, using the further heat recovered during the first cooling process as a heat source in the third melting process may reduce the amount of additional heat that is inputted to melt input material C (i.e. during the third melting process).

After the heat that is recovered and conveyed to furnace 104a by heat exchange system 112 and the further heat that is recovered and conveyed to furnace 106a by heat exchange system 114 has been withdrawn from the first cooling process, material A may still be hot enough to recover additional further heat. As exemplified, this additional further heat may be recovered by a heat exchange system 116. Heat exchange system 116 may convey the additional further heat recovered to furnace 108a where it may be used as a heat source in the fourth melting process (i.e. to melt or assist in melting input material D).

The additional further heat recovered by heat exchange system 116 may comprise heat recovered during the solidification of material A as it cools from temperature $T_2$ to a temperature $T_3$ that is lower than temperature $T_2$. Alternately, the additional further heat recovered by heat exchange system 116 may comprise heat recovered during the solidification of material A as it cools from a temperature above temperature $T_2$ to a temperature $T_3$ that is lower than temperature $T_1$. Optionally, recovery of the additional further heat commences once material A has reached temperature $T_2$ so that the heat provided to the third process 106 is higher.

Optionally, the melting temperature of material D may be less than the melting temperature of input material A, optionally less than the melting temperature of input material B and optionally less than the melting temperature of input material C. As with material B and C, the additional further heat may or may not provide the sole source of heat to melt material D and, if needed, additional heat may be inputted to assist in melting material D.

After the heat that is recovered and conveyed to furnace 104a by heat exchange system 112, the further heat that is recovered and conveyed to furnace 106a by heat exchange system 114, and the additional further heat that is recovered and conveyed to furnace 108a by heat exchange system 116 has been withdrawn from the first cooling process, material A may still be hot enough to recover residual heat. As exemplified, this residual heat may be recovered by a heat exchange system 118. Heat exchange system 118 may convey the residual heat recovered to a steam generator 110 where it may be used as a heat source to produce or assist in producing steam.

The residual heat recovered by heat exchange system 118 may comprise heat recovered during the solidification of material A as it cools from temperature $T_3$ to a temperature $T_4$ that is lower than temperature $T_3$. In this way, the heat, the further heat, the additional further heat, and the residual heat may be characterized as successively lower grades of heat recovered during the first cooling process.

The grades of heat recovered may be selected based on the intended use of the recovered heat. For example, temperature $T_2$ may be selected to correspond with the melting temperature of input material B (e.g., it may provide heat that is at a suitable temperature to operate furnace 104a).

It will be appreciated that, in some embodiments, heat may only be applied to initially melt input material A. Subsequent processes may be able to operate without the input of any additional heat (e.g. the input of additional heat may not be required to melt input materials B, C and D).

The heat exchange systems (e.g. heat exchange systems 112, 114, 116 and 118) may be operated to convey captured heat to specific melting processes. In some cases, one or more heat exchange systems 112, 114, 116, and 118 may be turned "off" so that the systems that are "on" may recover more heat as material A cools during the first cooling process. For example, heat exchanger systems 112 and 114 may be turned "off" so that a higher grade of heat may be recovered and conveyed by heat system 116 to the fourth meting process (i.e. to melt or assist in melting input material D). Alternatively, or in addition, one or more heat exchange systems 112, 114, 116, and 118 may be omitted from plant 100.

As also exemplified in FIG. 1, heat released by material B as it cools during the second cooling process (e.g. in mold 104b) may be similarly recovered and conveyed by one or more of heat exchange systems 120, 122 and 124 to furnace 106a, furnace 108a and steam generator 110, respectively. For example, heat exchange system 122 may recover heat from mold 104b and convey this recovered heat to furnace 108a where it may be used as a heat source for the fourth melting process (i.e. to melt or assist in melting input material D). As with heat exchange system 112, the temperature of the heat recovered by heat exchange system 120 may be above the melting temperature of material B. Alternately, the temperature of the heat obtained by heat exchange systems 112 and 120 may be combined to provide some or all of the heat requirement of furnace 106b (e.g., the heat exchange fluids of heat exchange systems 112 and 120 may be used to raise the temperature of a single heat exchange fluid that is then used to heat furnace 106b).

Alternatively, in another example, heat exchange systems 120 and 122 may recover heat from mold 104b and convey this recovered heat to furnaces 106a and 108a, respectively, where it may be used as a heat source for the third and fourth melting processes. In this example, the heat recovered by heat exchange systems 120 and 122 may be of the same or different grades. Alternatively, in yet another example, heat exchange systems 120 and 124 may recover heat from mold 104b and convey this recovered heat to furnace 106a and steam generator 110, respectively, where it may be used as a heat source for the third melting process and in the production of steam.

As exemplified, heat released by material C as it cools during the third cooling process (e.g. in mold 106b) may be similarly recovered and conveyed by heat exchange systems 122 and 124 to furnace 108a and steam generator 110, respectively.

As exemplified, heat released by material D as it cools during the fourth cooling process (e.g. in mold 108b) may be similarly recovered and conveyed by heat exchange system 124 to steam generator 110.

Accordingly, it will be appreciated that, during the cooling profile of a material, heat may be captured during different stages of the cooling profile (e.g., $T_{melting}$—$T_1$, $T_1$-$T_2$, $T_2$-$T_3$) and used for different purposes. It will be appreciated that the temperature ranges may not overlap (e.g., one heat exchange system may operate once a material has cooled below a temperature at which another heat exchange system draws heat from that same material).

In some cases, input material A and input material B may be metals and input material C and input material D may be plastics having different melting temperatures. Optionally, input materials A, B, C and D that are selected for processing in method 100 may be selected to have successively lower melting temperatures. Plastic D may be selected to have a lower melting temperature than plastic C, plastic C may be selected to have a lower melting temperature than metal B and metal B may be selected to have a lower melting temperature than metal A. In this example, input material A may be steel, input material B may be zinc, input material C may be polypropylene (PP) and input material D may be low-density polyethylene (LDPE). These material selections are possible because the melting temperature of steel is approximately 1,370° C., the melting temperature of zinc is approximately 420° C., the melting temperature of PP is approximately 160° C., and the melting temperature of LDPE is approximately 105-115° C. (i.e. successively lower melting temperatures). Those skilled in the art will appreciate that many potential combinations of input materials may be selected for processing in plant 100.

Plant 100 may provide for one or more advantages. For example, by using heat recovered during the first cooling process as a heat source in the melting processes of material B, material C, and/or material D, the amount of additional energy that is inputted into furnaces 104a, 106a, and/or 108a to melt the input materials may be reduced or, in some cases, eliminated. Further, by using heat recovered during the second cooling process as a heat source in the melting processes of material C, and/or material D, the amount of additional energy that is inputted into furnaces 106a and/or 108a to melt the input materials may be reduced or, in some cases, eliminated. The same applies to using the heat recovered during the third and fourth cooling processes to reduce or eliminate the amount of inputted additional energy to melt the input materials. The recovery and use of heat that is otherwise wasted may reduce the overall amount of energy used by plant 100 during its operation. In turn, this may lower the plant's energy costs and/or carbon footprint.

As exemplified, plant 100 includes four material processing zones (e.g. processing zones 102, 104, 106, and 108). Those skilled in the art will appreciate that the exemplary plant 100 described herein can be modified to include more or less material processing zones as desired.

Figure 2A:
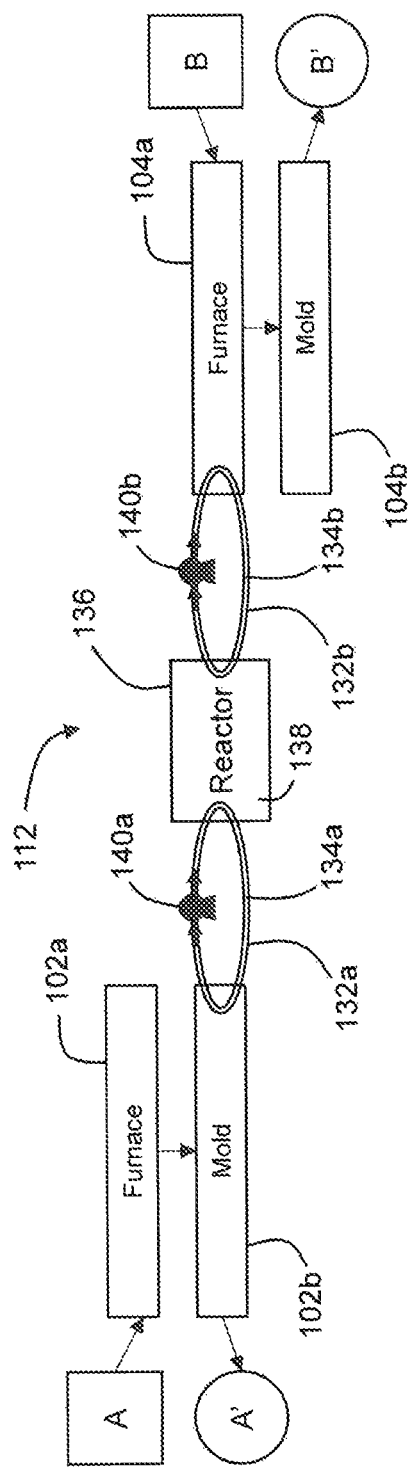
FIG. 2A is a schematic block diagram illustrating a first example embodiment of a heat exchange system.
Figure 2B:
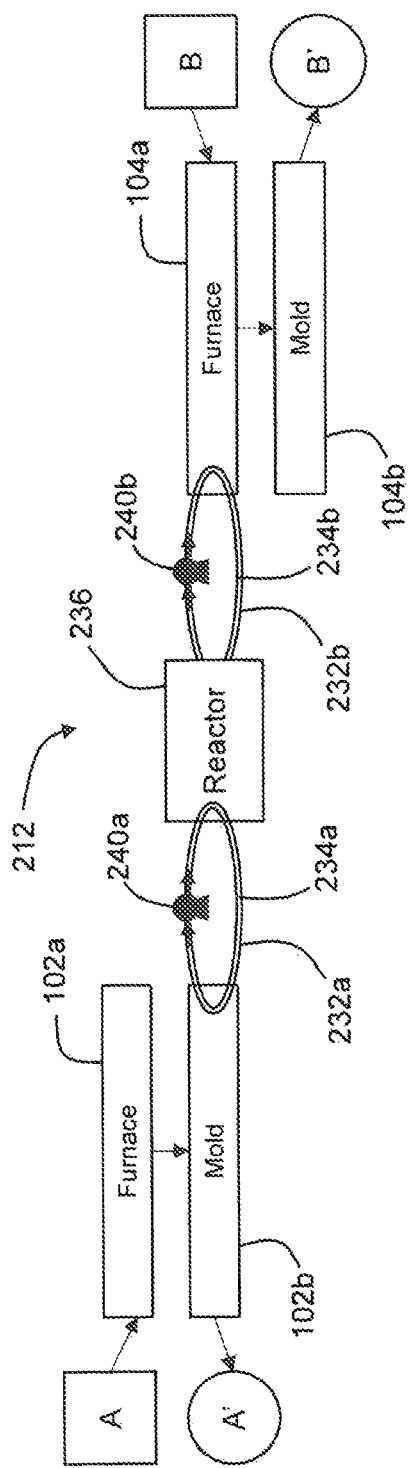
FIG. 2B is a schematic block diagram illustrating a second example embodiment of a heat exchange system; and, FIG. 2C is a schematic block diagram illustrating a third example embodiment of a heat exchange system.
Figure 2C:
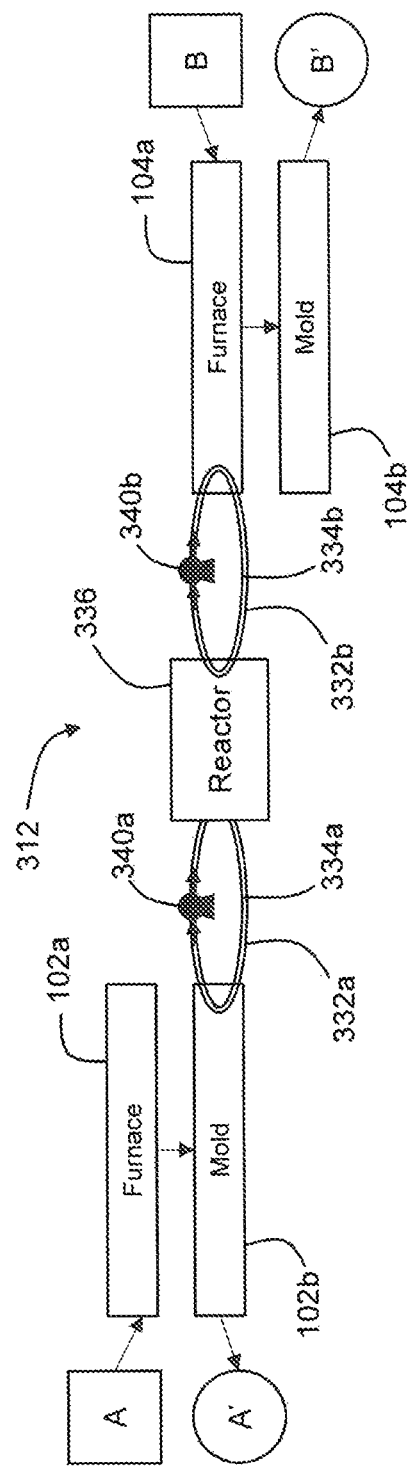

It will be appreciated that any or all of the heat exchange systems referenced hereinbefore may be any method of heat transfer known in the heat transfer arts. FIGS. 2A-2C exemplary heat exchange systems that may be used in plant 100. FIG. 2A shows a schematic block diagram of heat exchange system 112 used to thermally couple mold 102b and furnace 104a. Those skilled in the art will appreciate that heat exchange systems 114, 116, 118, 120, 122, 124, 124, 126, 128 and 130 may be analogous to heat exchange system 112.

Heat exchange system 112 includes a first loop 132a having a first heat exchange fluid 134a contained therein, a second loop 132b having a second heat exchange fluid 134b contained therein, and a reactor 136 having a third heat exchange fluid 138 contained therein. Reactor 136 is in thermal communication with each of first and second loops 132a and 132b. In this arrangement, the third heat exchange fluid 138 is heated by the first heat exchange fluid 134a and is used to heat the second heat exchange fluid 134b. The heat exchange fluids 134a, 134b and 138 may be a silicon oil, a liquid metal, or another suitable heat exchanger fluid. As exemplified, heat exchange system 112 may also include a first loop pump 140a to circulate the first heat exchange fluid 134a within the first loop 132a and a second loop pump 140b to circulate the second heat exchange fluid 134b within the second loop 132b. First and second pumps 140a and 140b may be used to control a corresponding flow rate of first and second heat exchange fluids 134a and 134b. Reactor 136 may be a stirred tank reactor or the like so as to maintain a more uniform temperature of the heat exchange fluid in reactor 136.

With continued reference to FIG. 2A, first loop 132a is in thermal communication with mold 102b (e.g., cooling tubes in mold 102b) and reactor 136 (e.g., first loop 132a may have heating tubes surrounding reactor 136 or passing through reactor 136). In this arrangement, the first heat exchange fluid 134a, which is at a lower temperature that material A, may absorb heat from material A as it cools during the first cooling process. Thus, the first heat exchange fluid 134a is able to capture at least a portion of the heat that material A releases as it cools. The first heat exchange fluid 134a may convey the heat it captured to reactor 136 where it may be transferred to the third heat exchange fluid 138 to heat the third heat exchange fluid 138. It will also be appreciated that a heat exchanger may be used to convey heat from fluid 134a to fluid 138.

The second loop 132b is in thermal communication with reactor 136 (e.g., second loop 132b may have heating tubes surrounding reactor 136 or passing through reactor 136) and furnace 104a (e.g., heating tubes in furnace 104a). In this arrangement, the second heat exchange fluid 134b, which is at a lower temperature that heat exchange fluid 138 in reactor 136, may absorb heat from heat exchange fluid 138 and convey the heat to furnace 104a. Thus, the second heat exchange fluid 134b is able to convey at least part of the heat captured from material A as it cools and convey that heat to furnace 104a. It will also be appreciated that a heat exchanger may be used to convey heat from fluid 138 to fluid 134b.

Thus, the heat captured by the first heat exchange fluid 134a may be transferred to the second heat exchange fluid 134b, via the third heat exchange fluid 138, to heat the second heat exchange fluid 134b. Reactor 136 may be used as a buffer tank to store heat until the heat is required. It will be appreciated that, in alternate embodiments, a reactor 136 may not be required. For example, loop 132a may be used to directly heat furnace 104a.

FIG. 2B shows a schematic block diagram of another exemplary heat exchange system, referred to generally as 212. Heat exchange system 212 shown in FIG. 2B is similar to heat exchange system 112 shown in FIG. 2A, except that the second loop 232b and reactor 236 are in fluid communication. As exemplified, in this configuration, the second heat exchange fluid 234b of second loop 232b may flow in and out of reactor 236 (i.e. there is no isolated third heat exchange fluid contained within reactor 236). Elements having similar structure and/or performing similar function as those in the example heat exchange system 112 in FIG. 2A are numbered similarly, with the reference numerals incremented by 100.

As first loop 232a is in thermal communication with reactor 236, the first heat exchange fluid 234a may convey the heat captured during the first cooling process to reactor 236 where it may be transferred to the second heat exchange fluid 234b within reactor 236 to heat the second heat exchange fluid 234b. Since reactor 236 is in fluid communication with the second loop 232b, the heated second heat exchange fluid 234b may flow out of the reactor 236 via the second loop 232b. As with heat exchange system 112, the second loop 232b is in thermal communication with furnace 104a. In this configuration, the second heat exchange fluid 234b may exchange heat with the furnace 104a to heat the furnace 104a.

FIG. 2C shows a schematic block diagram of another exemplary heat exchange system, referred to generally as 312. Heat exchange system 312 shown in FIG. 2C is similar to heat exchange system 112 shown in FIG. 2A, except that the first loop 332a and reactor 336 are in fluid communication. As exemplified, in this configuration, the first heat exchange fluid 334a of first loop 332a may flow in and out of the reactor 336 (i.e. there is no isolated third heat exchange fluid contained within reactor 336). Elements having similar structure and/or performing similar function as those in the example heat exchange system 112 in FIG. 2A are numbered similarly, with the reference numerals incremented by 200.

As with heat exchange system 112, the first loop 332a is in thermal communication with mold 102b. In this configuration, the first heat exchange fluid 334a may exchange heat with material A as it cools in mold 102b (i.e. during the first cooling process). Since the first loop 332a is in fluid communication with reactor 336, the heated first heat exchange fluid 334a may flow into reactor 336. As reactor 336 is in thermal communication with the second loop 332b, the first heat exchange fluid 332a within reactor 336 may exchange heat with the second heat exchange fluid 334b to heat the second heat exchange fluid 334b. As with heat exchange system 112, the second loop 332b is in thermal communication with furnace 104a. In this configuration, the second heat exchange fluid 334b may exchange heat with the furnace 104a to heat the furnace 104a.

Those skilled in the art will appreciate that heat exchange systems 114, 116, 118, 120, 122, 124, 124, 126, 128 and 130 may be analogous to any one of exemplary heat exchange systems 112, 212 and 312.

As used herein, the wording "and/or" is intended to represent an inclusive- or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of recycling heat during operation of a plant in which equipment for processing at least two different materials is co-located, the method comprising:
    (a) a first process which processes a first material having a first melting point, wherein, during the first process, the first material is subjected to a first melting process and then subjected to a first cooling process that includes solidification of the first material;
    (b) a second process which processes a second material having a second melting point, wherein the second melting point is less than the first melting point and, during the second process, the second material is subjected to a second melting process and then subjected to a second cooling process that includes solidification of the second material; and,
    (c) recovering heat from the first cooling process and using at least some of the heat as a heat source for the second melting process
    wherein recovering heat from the first cooling process comprises using a first heat exchange fluid to recover heat from the first cooling process and the first heat exchange fluid conveys the heat recovered from the first cooling process to a reactor containing a second heat exchange fluid, using at least some of the heat as a heat source for the second melting process comprises using the second heat exchange fluid to convey at least some of the heat, which was recovered from the first cooling process, to the second melting process.

2. The method of claim 1 wherein the heat recovered from the first cooling process comprises heat recovered during the solidification of the first material.

3. The method of claim 1, further comprising:
(a) recovering heat from the second cooling process and using at least some of the heat recovered from the second cooling process as a heat source for a building, wherein the heat recovered from the second cooling process comprises heat recovered during the solidification of the second material.

4. The method of claim 1, further comprising:
(a) recovering heat from the second cooling process and using at least some of the heat recovered from the second cooling process as a heat source in the production of steam, wherein the heat recovered from the second cooling process comprises heat recovered during the solidification of the second material.

5. The method of claim 1, wherein during the first cooling process, the first material is cooled to a first temperature and a second temperature that is less than the first temperature, wherein recovering heat from the first cooling process comprises recovering heat as the first material is cooled to the first temperature, the method further comprises:
(a) a third process which processes a third material having a third melting point, wherein the third melting point is less than the second melting point and, during the third process, the third material is subjected to a third melting process and then subjected to a third cooling process that includes solidification of the third material; and,
(b) recovering additional heat from the first cooling process as the first material is cooled to the second temperature and using at least some of the additional heat that is recovered as a heat source for the third melting process.

6. The method of claim 5 wherein the additional heat recovered from the first cooling process is recovered as the first material is cooled from the first temperature to the second temperature.

7. The method of claim 5 further comprising recovering heat from the second cooling process and using at least some of the heat recovered from the second cooling process as a heat source for the third melting process.

8. The method of claim 5 wherein, during the first cooling process, the first material is cooled to a third temperature that is less than the second temperature, the method further comprises recovering further additional heat from the first cooling process as the first material is cooled to the third temperature and using at least some of the further additional heat as a heat source for a building.

9. The method of claim 5 wherein, during the first cooling process, the first material is cooled to a third temperature that is less than the second temperature, the method further comprises recovering further additional heat from the first cooling process as the first material is cooled to the third temperature and using at least some of the further additional heat in the production of steam.

10. The method of claim 5, wherein the third process uses at least some recycled third material.

11. The method of claim 5, further comprising selecting a metal as the first material, selecting a first plastic as the second material and selecting a second plastic as the third material, wherein the second plastic has a lower melting point than the first plastic, and wherein the first plastic has a lower melting point than the metal.

12. The method of claim 5, wherein during the first cooling process, the first material is cooled to a third temperature that is less than the second temperature, and the method further comprises:
(a) a fourth process which processes a fourth material having a fourth melting point, wherein, the fourth melting point is less than the third melting point and, during the fourth process, the fourth material is subjected to a fourth melting process and then subjected to a fourth cooling process that includes solidification of the fourth material; and,
(b) recovering further additional heat from the first cooling process as the first material is cooled to the third temperature and using at least some of the further heat that is recovered as a heat source for the fourth melting process.

13. The method of claim 12 wherein, during the second cooling process, the second material is cooled to a fourth temperature and a fifth temperature that is less than the fourth temperature, the method further comprises recovering heat from the second cooling process as the second material is cooled to the fourth temperature and using at least some of the heat recovered from the second cooling process as a heat source for the third melting process and recovering additional heat from the second cooling process as the second material is cooled to the fifth temperature and using at least some of the additional heat that is recovered from the second cooling process as a heat source for the fourth melting process.

14. The method of claim 12, further comprising recovering heat from the third cooling process and using at least some of the heat recovered from the third cooling process as a heat source for the fourth melting process.

15. The method of claim 12, further comprising selecting a first metal as the first material, selecting a second metal as the second material, selecting a first plastic as the third material and selecting a second plastic as the fourth material, wherein the second plastic has a lower melting point than the first plastic, wherein the first plastic has a lower melting point than the second metal, and wherein the second metal has a lower melting point than the first metal.

16. The method of claim 12, wherein the fourth process uses at least some recycled fourth material.

17. The method of claim 1, further comprising selecting a metal as the first material and selecting a plastic as the second material.

18. The method of claim 1 wherein the first heat exchange fluid comprises a liquid metal.

19. The method of claim 1 wherein the first process uses at least some recycled first material.

20. The method of claim 1 wherein the second process uses at least some recycled second material.

21. The method of claim 20 wherein the first process uses at least some recycled first material.

* * * * *